United States Patent [19]
Kennedy et al.

[11] Patent Number: 6,084,968
[45] Date of Patent: Jul. 4, 2000

[54] SECURITY TOKEN AND METHOD FOR WIRELESS APPLICATIONS

[75] Inventors: Paul Roy Kennedy; Timothy Gerard Hall, both of Mesa; Douglas Allen Hardy, Scottsdale, all of Ariz.

[73] Assignee: Motorola, Inc., Schaumburg, Ill.

[21] Appl. No.: 08/960,476

[22] Filed: Oct. 29, 1997

[51] Int. Cl.[7] ................................................ G06K 9/00
[52] U.S. Cl. ................................................ 380/259; 380/46
[58] Field of Search ....................... 380/44, 54; 382/181, 382/116, 115

[56] References Cited

U.S. PATENT DOCUMENTS

| | | | |
|---|---|---|---|
| 4,944,008 | 7/1990 | Piosenka | 380/45 |
| 4,993,068 | 2/1991 | Piosenka et al. | 380/23 |
| 5,047,613 | 9/1991 | Swegen et al. | 235/379 |
| 5,202,921 | 4/1993 | Herzberg et al. | 380/23 |
| 5,347,580 | 9/1994 | Molva et al. | 380/25 |
| 5,412,723 | 5/1995 | Canetti et al. | 380/21 |
| 5,457,747 | 10/1995 | Drexler et al. | 380/24 |
| 5,461,675 | 10/1995 | Diehl et al. | 380/23 |
| 5,469,506 | 11/1995 | Berson et al. | 380/23 |
| 5,471,045 | 11/1995 | Geronimi | 235/492 |
| 5,485,519 | 1/1996 | Weiss | 380/23 |
| 5,513,272 | 4/1996 | Bogosian | 382/116 |
| 5,517,569 | 5/1996 | Clark | 380/24 |
| 5,563,945 | 10/1996 | Gercekci | 380/4 |
| 5,594,227 | 1/1997 | Deo | 235/380 |
| 5,602,918 | 2/1997 | Chen et al. | 380/21 |
| 5,612,682 | 3/1997 | DeLuca et al. | 340/825 |
| 5,615,260 | 3/1997 | Kurgan | 379/433 |
| 5,623,546 | 4/1997 | Hardy et al. | 380/4 |
| 5,623,637 | 4/1997 | Jones et al. | 395/491 |
| 5,809,140 | 9/1998 | Rubin | 380/21 |

*Primary Examiner*—Thomas R. Peeso
*Assistant Examiner*—Todd Jack
*Attorney, Agent, or Firm*—Gregory J. Gorrie; Sharon Coleman; Frank J. Bagacz

[57] ABSTRACT

Apparatus and a method are described for providing for multiple secure functions in a host or wireless radiotelephone. Access to the functionality of the radiotelephone is provided by means of a smart card or security token features contained therein. The determination of the secure function which is accessed is determined by encrypted credential information carried in the smart card. The smart card may be used for numerous applications, but is particularly useful in conjunction with radiotelephone devices having a plurality of secure communication levels. The radiotelephone device will activate the secure levels based on the security level algorithm carried in the smart card.

20 Claims, 4 Drawing Sheets

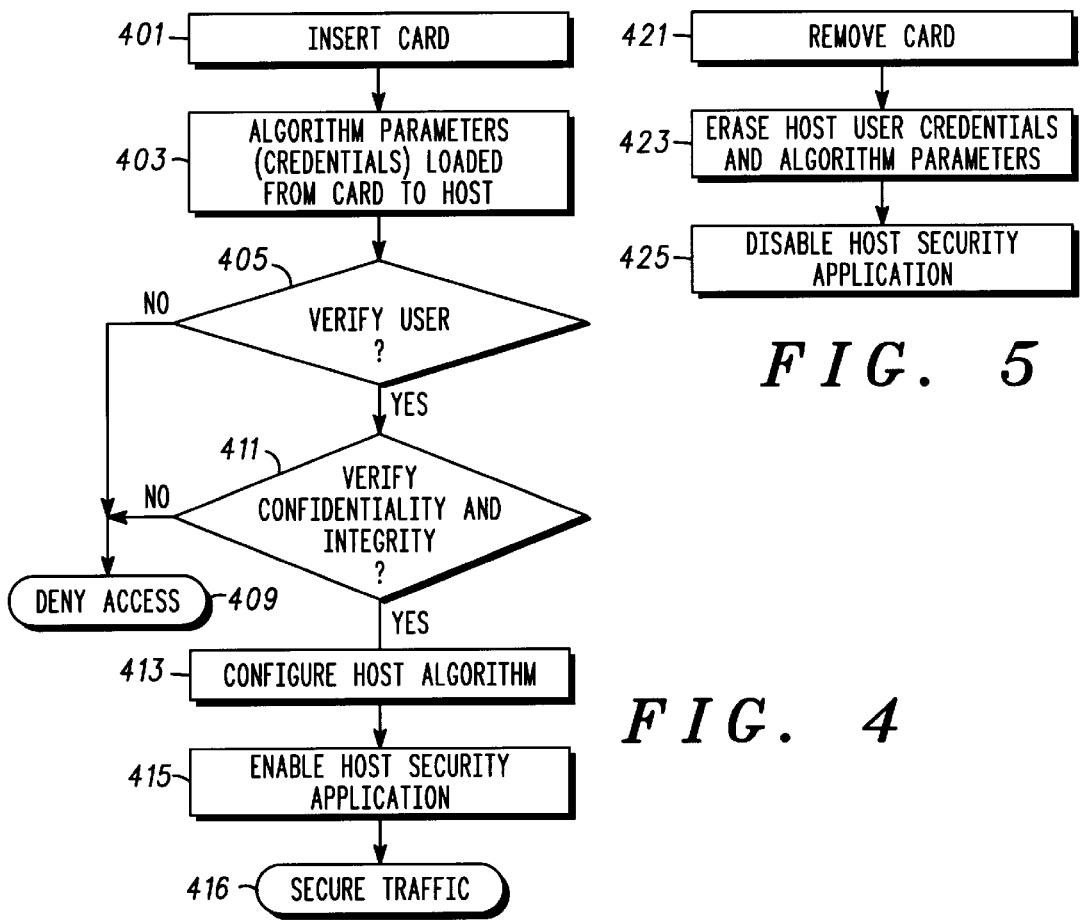
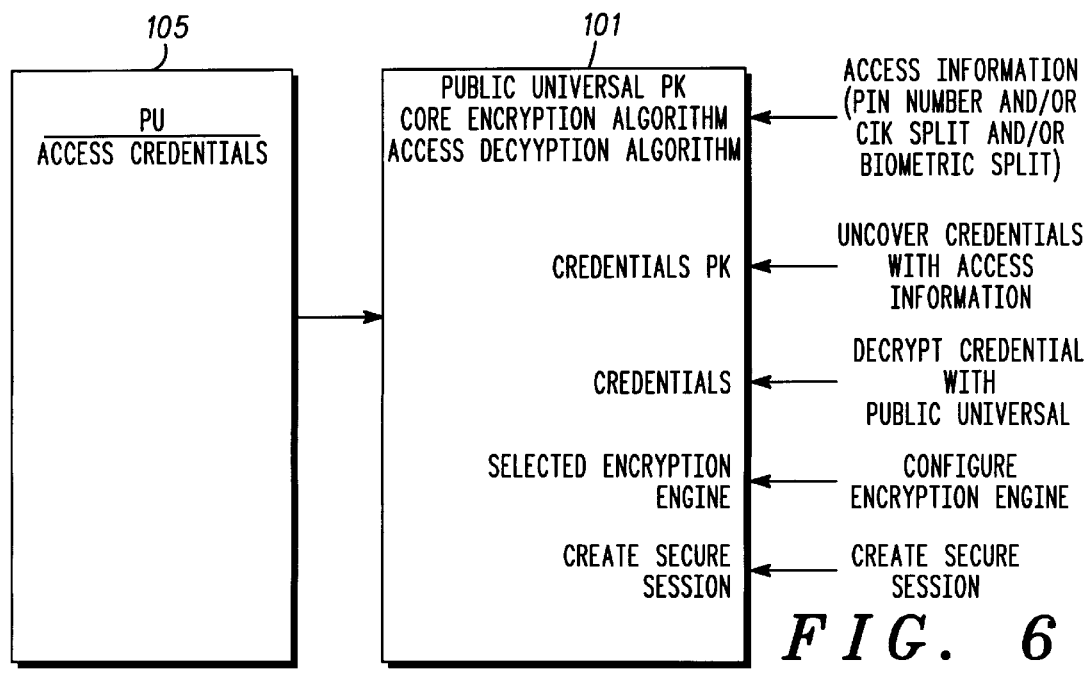

SECURITY TOKEN AND METHOD FOR WIRELESS APPLICATIONS

FIELD OF THE INVENTION

This invention pertains to a host communication device in which a security access token is used to access secure functions within the device, in general, and to a communications system in which security access tokens are utilized to enable various levels of secure communications features within the host communication device, in particular.

BACKGROUND OF THE INVENTION

One problem with the use of highly portable communications devices such as personal communication devices and cellular phone type devices is providing security measures to assure privacy in communication. Encryption techniques are used to provide for secure, private wireless communication. Different levels of security are used depending on the type of information being communicated. Each level of security may use many different encryption/decryption algorithms. Typically there are four levels of security in communications used in the United States. These different levels generally apply throughout the world. Generally speaking, the encryption algorithms are segmented into the various levels because of the nature of the community that is being protected. For example, "level 1" security algorithms are for U.S. Government classified communications. "Level 2" and "level 3" security algorithms are used in a broader domain and are used in certain applications but it is desirable that these not be ubiquitous around the world. Level 4 algorithms are a weaker level of algorithms that provide general purpose privacy but are useable around the world. There is a need to be able to manufacture and distribute communications products that provide the different levels of security. The problem is how to provide and segment the products in accordance with the different levels of security.

Various measures have been proposed in the past to provide security in numerous applications in which it is necessary or desirable to limit access to a system. Passwords, for example, have been widely used to guard authorized access to computers and data. However, password verification schemes are most reliable when the password is manually entered and are not as effective when human interaction cannot be guaranteed. In other arrangements, electronic keys or tokens are used. Possession of the key or token identifies a user as being a valid user. The lack of possession of such a key or token would indicate that the user is not who he claims to be and he is denied use of the device. However, this arrangement is subject to unauthorized access occurring if an unauthorized user gains possession of the key or token.

Various arrangements have been proposed or utilized in the past in which a biometric of a person is used to verify or authenticate identification of a system user. "Biometric" as defined, for example, in U.S. Pat. No. 5,469,506, means a substantially stable physical characteristic of a person which can be automatically measured and characterized for comparison. In addition, biometrics may also include behavioral characteristics, such as the manner in which an individual writes his or her signature.

Increasingly, so called "smart cards" are used for a variety of purposes. A "smart card" is typically a credit card sized card that has a built-in microcontroller which enables the card to provide, modify or even create data in response to external stimuli. In many instances, the microcontroller is a single wafer integrated circuit which is mounted on an otherwise plastic credit card. Various smart card protection schemes have been devised to protect the unauthorized access to the data contents on such smart cards.

Split key systems help ensure key secrecy. In split key systems, an encryption key variable is used to encrypt the data. The key is then split, reduced, or otherwise manipulated into independent portions called splits and the original key is then destroyed. The action of splitting a key is referred to as reducing herein to avoid confusion with the end result of reduction (i.e., splits). A key may be reduced through any of a variety of mathematical operations which render the resulting splits virtually useless apart from one another but which allow the splits to be combined to recreate the original key.

In a split key system, one split or portion of the original key is stored in host equipment and the other split is stored elsewhere, such as in a removable and portable device. The portable device and host equipment need to be brought together to decrypt the data because neither the host nor the portable device has the complete key information necessary to decrypt the data on its own. When the portable device and the host equipment are combined, the original key can be regenerated from the splits (the portions of the original key), the stored information may be decrypted, and operations that use the encrypted data may be performed.

Some types of host equipment grant access to multiple portable devices. This is accomplished by having the host equipment contain a number of different splits of the key. Any portable device having an appropriate split to match one of the host splits can then be used to access the encrypted data. Likewise, some portable devices store multiple splits, allowing them to be used to access separate databases stored on different host equipment.

One problem in the past with providing secure functions in portable host devices such as a cellular telephone or personal communications device, is that each host typically may be utilized only for a single level of security. To provide for different levels of secure functions, different portable hosts are utilized, each requiring a different secure access token.

An additional problem is to provide access control, anti-tamper functionality and variable security levels in devices such as wireless telecommunications devices. It would be desirable to provide a wireless communication device that is universally useable over a range of secure functions.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 4 is an operational flow diagram of operation of the system of FIG. 1 in accordance with the invention;

FIG. 5 is an operational flow diagram;

FIG. 6 illustrates the functions performed by a card and a host in accordance with the invention.

The example set out herein illustrates a preferred embodiment of the invention in one form thereof, and such example is not intended to be construed as limiting in any manner.

DETAILED DESCRIPTION OF THE DRAWINGS

The present invention provides a system and method for allowing a host apparatus to have multiple secure functions, which are accessed by a token or "smart card." In accordance with the invention, a host or, in the case of the embodiment described, a cellular telephone or personal communications device, has embedded in it a portion of the for algorithm at least one secure encryption level, and preferably has embedded in it portions of each algorithm for each of a plurality of secure encryption levels. A smart card is used to enable a particular security level on each personal communications device. The smart card contains the remaining portion of at least one of the levels of security to which the possessor of the smart card is authorized. The algorithm is treated as stored data on the smart card and is encrypted for security purposes. A split key encryption system encrypts data and stores that data on the smart card. One split of the encryption key is stored in the smart card and another split of the key is stored in the host or personal communication device. When the smart card is inserted in the host or personal communication device, secure communications are enabled according to the level type of security function corresponding to the security credentials carried on the smart card. For additional security, a password authentication feature is provided to prevent unauthorized users from creating their own access rights. The password authentication feature prevents the system from being subject to an unauthorized person gaining access to the host's splits, and thereby gaining access to the secure functions of the personal communication device. Details with respect to split encryption arrangements, which are particularly applicable for use in the present invention, are shown and described in U.S. Pat. No. 5,623,546, which is assigned to the present assignee. The disclosure of that patent is incorporated herein by reference. Similarly, U.S. Pat. No. 5,612,682, also assigned to a common assignee of the present invention, describes encryption apparatus and systems which may also be advantageously used in the present invention. The description contained in that patent is also incorporated herein by reference.

Figure 1:
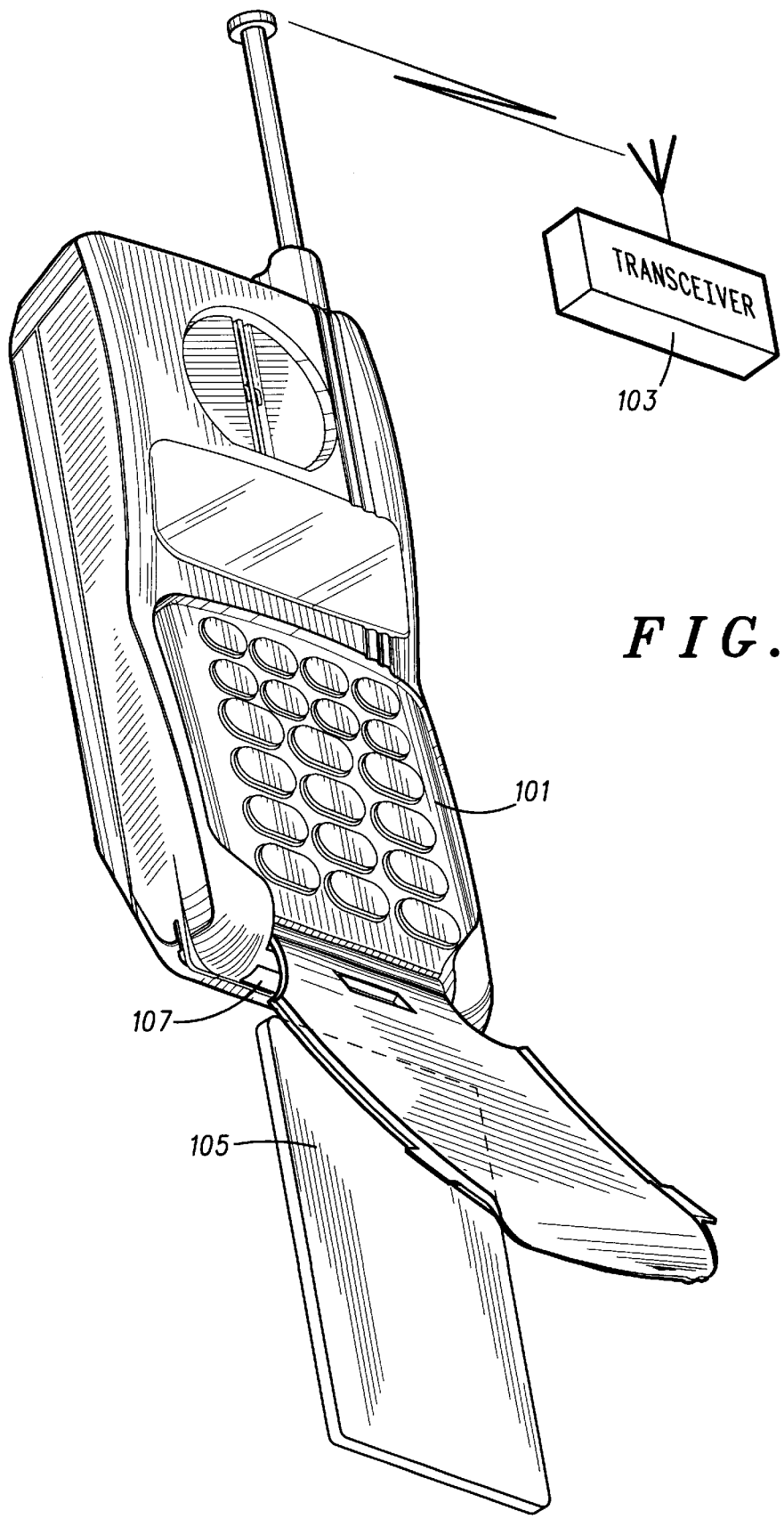
FIG. 1 is a perspective view of a system comprising a cellular telephone and smart card in accordance with the invention.

FIG. 1 illustrates a communication device or radiotelephone 101 to which the principles of the invention may be advantageously applied. Radiotelephone 101 is a personal communication device or cellular telephone of a type which is particularly adapted to be used in a telecommunication system wherein communication is via a transceiver 103. Transceiver 103 is a fixed site transceiver in the case of ground based cellular telephone systems or may be a satellite based transceiver in the case of a personal communication system utilizing satellites. Radiotelephone 101 includes an opening or receiver portion 107 which is adapted to receive a token such as smart card 105. Smart card 105 can be a full size smart card or a chip size smart card. U.S. Pat. No. 5,615,260 describes the construction of a radiotelephone such as that shown in FIG. 1 in greater detail and the details of that patent are incorporated herein by reference.

In one embodiment of the present invention, token 105 may be comprised entirely of software. In such as embodiment, a hardware smart card is not required. The software token securely contains the information that would otherwise be embodied in a hardware smart card token.

Smart card 105 is read by a card reader disposed within radiotelephone 105. Card readers for smart cards are known and the particular details thereof are of no significance to the present invention. Smart card 105 is utilized as a security token or key in accordance with the principles of the invention. A smart card 105 suitable for use with the invention is described in U.S. Pat. No. 5,563,945 which is assigned to the same assignee as the present invention. The disclosure set forth in that patent is incorporated herein by reference. Those skilled in the art will appreciate that the term "smart card" as used herein is intended to refer to a variety of media, including integrated circuit "chip cards" and PCMCIA cards.

To provide for an authentication function, smart card 105 may store biometric features of a user. The biometric features are encrypted and stored in the smart card 105. When smart card 105 is inserted into radiotelephone 101, via opening 107 the user is prompted to provide the biometric information. Radiotelephone 101 circuitry compares biometric information provided by the user with biometric information retrieved from smart card 105 to authenticate the user. If the comparison is successful, access to the functions of the radiotelephone will be provided.

Figure 2:
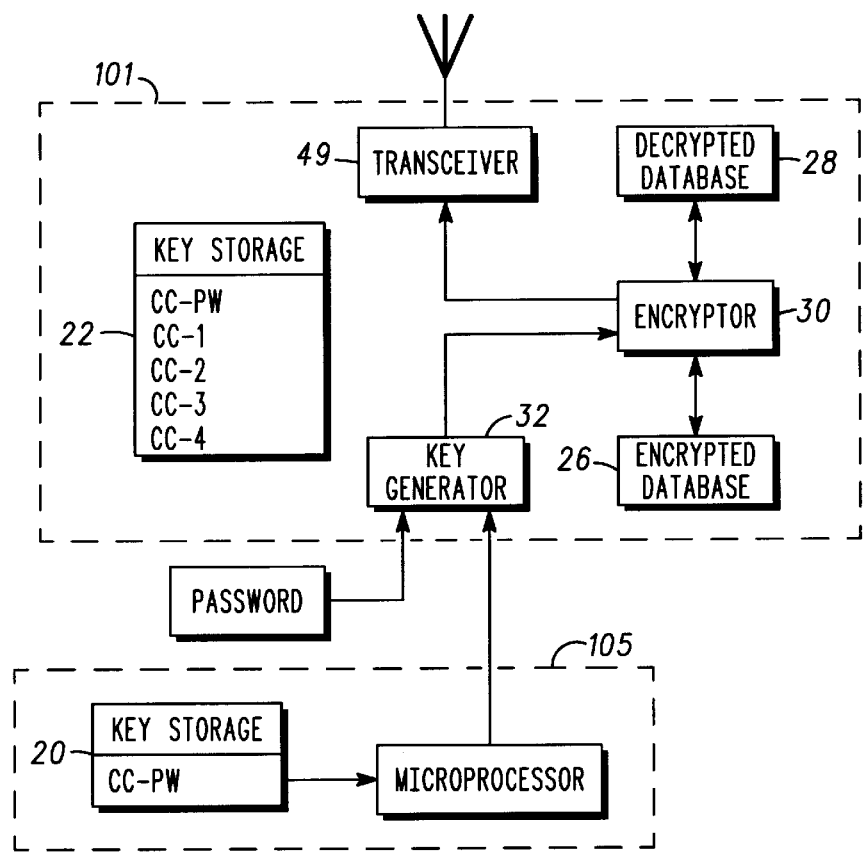
FIG. 2 is a block diagram of a portion of the system of FIG. 1.

Turning now to FIG. 2, a functional block diagram is shown in which a portion of the host or radiotelephone 101 is shown in functional connection to the smart card 105. The smart card 105 includes a key storage memory area 20. In key storage memory area 20, the smart card 105 stores splits that correspond to the host personal communications device 101. Key storage memory area 20 also stores a password modified split (CC-PW) which may, for example, be a personal identification number or PIN. The key storage 20 also may include biometric authentication split information.

Although host device 101 is illustrated as a communication device in FIG. 1, other host devices are also suitable. For example, host device 101 may be any data or information storage device where data is unlocked or locked.

The host device 101 includes a key storage memory 22. The key storage memory 22 includes a public universal key, as well as a core encryption algorithm and access decryption algorithms corresponding to different levels of access of secure functions. In key storage memory 22, the host 101 stores various splits including a password modified split (CC-PW) and other splits (CC-1, CC-2, CC-3 and CC-4) that correspond to various levels of secure functions, such as the levels of secure transmission which are embedded in the host 101. Host 101 also contains a memory area to store an encrypted database 26. Desirably, the area where encrypted database 26 resides is configured as a non-volatile memory so that in the event of power loss to the host device 101, the encrypted database 26 will not be lost. The data stored in database 26 may be any type of sensitive information. For example, the data could be cryptographic algorithms or key variables which might be used to set up secure communication or device authentication.

The host 101 also contains a decrypted database memory 28. Memory 28 is used to store the data from database 26 after the data has been decrypted and while the data are to be used. Desirably, memory 28 is configured as volatile memory so that no decrypted copy of the data remains available after power has been removed from the host device 101. However, host device 101 need not rely exclusively upon the volatile nature of memory area 28 to ensure that decrypted versions of sensitive data are unnecessarily available. Desirably, host 101 includes processes to wash memory 28 whenever the decrypted data are not in use.

In the embodiment shown in FIG. 2, the host 101 also contains an encryptor 30 in data communication with databases 26 and 28 and a key generator 32 in data communication with encryptor 30. Encryptor 30 is a conventional encryption/decryption device capable of performing encryption and decryption using an encryption technique which is suitable for this application. DES represents one well know encryption technique, and those skilled in the art are aware of other techniques. Encryptor 30 uses an encryption key to encrypt data and store it in the encrypted database 26. Likewise, encryptor 30 decrypts the encrypted data for storage in the decrypted database 28 and subsequent access. The key generator 32 performs a multitude of key related operations, including recreating the key from password modified splits.

Figure 3:
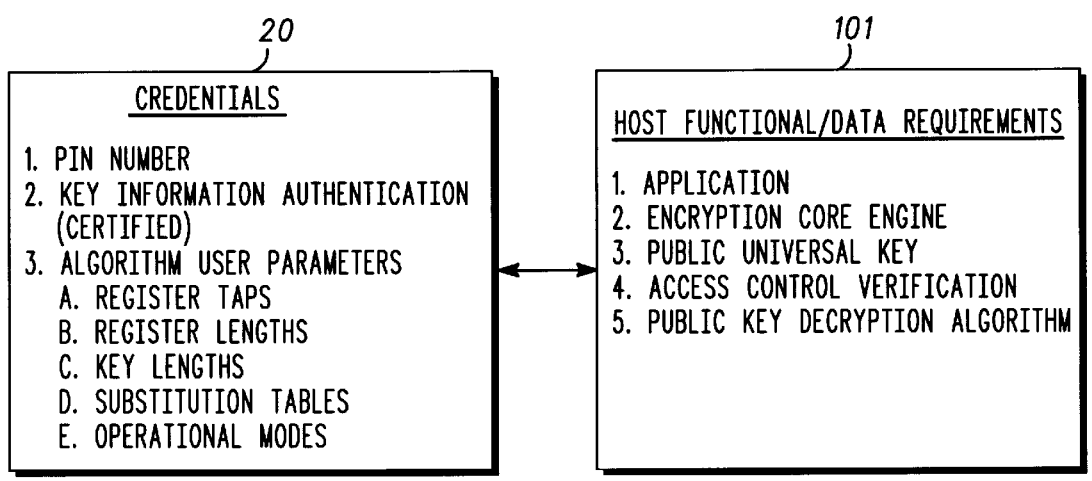
FIG. 3 is a diagram illustrating the memory organization of a smart card and a personal communications device.

FIG. 3 is a diagram illustrating the memory organization of a smart card and a personal communications device. FIG. 3 illustrates, among other things, the credentials stored on smart card 105 in tabular form. FIG. 3 also illustrates the functions and data stored at the host for providing the security functions in accordance with the principles of the invention. Smart card 105 includes stored in its memory as a password a personal identification number, PIN, as well as key information for local authentication. Also, the credentials include algorithm user parameters such as register taps, register lengths, key lengths, substitution tables and operational modes. The host 101 provides application functions, encryption core engine, a public universal key, access control verification and a public key decryption algorithm.

Turning now to FIG. 4, an overview of the operational flow of a radio telephone 101 utilizing the invention as shown. The initial step 401 in the process is for the user to insert the token or smart card 105 into the host or in the specific embodiment shown, the cellular phone 101. After smart card 105 has been inserted into host 101, the host in step 403 requests credential information from the card 105. The credential information is used for access control and contains the algorithm parameters which are used to configure the algorithm contained within host 101. The credentials are super encrypted, first with a universal private key and secondly with access control information. The user is verified in step 405. The user must enter correct access control information which may, depending on the selected type of access control information be a Cipher Ignition Key (CIK), CIK split and/or a biometric split, and/or a personal identification number, PIN. If the user enters the correct access control information, the credential information is decrypted with the access information and the user is verified as indicated in step 405. The encrypted biometric feature vectors and personal identification number stored on the card 105 are loaded from smart card 105 to host 101 or in this instance, to radio telephone 101 in step 403. A decryption operation occurs in which access information, i.e., the biometric feature vectors and personal identification number are decrypted at step 405. A personal identification number (PIN) inserted by the user is compared against the personal identification number decrypted from the card 105 at step 405. If the personal identification number does not match, access to use the radiotelephone 101 is denied at step 409. If, however, the personal identification number matches, biometric verification is performed at step 405. If biometric verification of the user does not occur, the system will again deny access (in step 409). If biometric verification is successful, various limited access secure functions of the host or radiotelephone 101 may be accessed. Host 101 decrypts the algorithm data received from the smart card 105 using a public key decryption algorithm to verify the signature of the user smart card at step 411. The host algorithm is configured, in step 413. With the host algorithm configured, the host security functions corresponding to the algorithm are enabled at step 415 for use by the user and secure communication may ensue (step 416).

The operation may be reversed as shown in FIG. 5 by removing the card 105 at step 421. At that time, the host or radio telephone 101 erases the credentials and algorithm parameters at step 423. The host security application is then disabled at step 425 until such time as it is enabled again by repeating the process set forth in steps 401 through 416.

Figure 7:
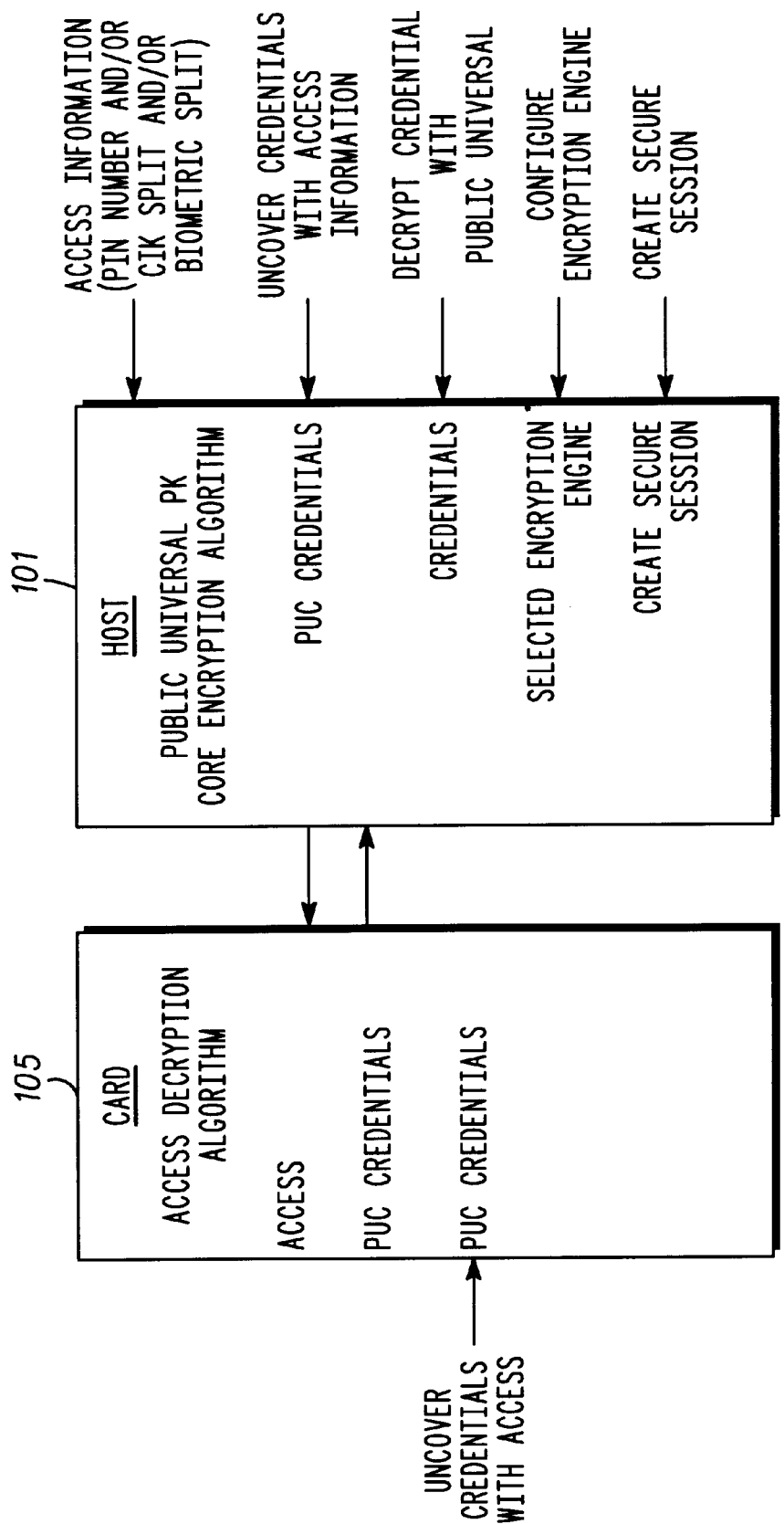
FIG. 7 illustrates the functions performed by a card and a host in accordance with the invention.

Turning now to FIGS. 6 and 7, two different scenarios for access control to the radio telephone device 101 are shown. In both these drawings, the card 105 functionality is shown and the host or radio telephone device 101 functionality is likewise shown. In the embodiment shown in FIG. 6, a trusted third party creates credentials for the user and then encrypts the data with a private universal code (PUC) known only to the trusted third party. The trusted third party also signs the encrypted credentials with access information for access control. Smart card 105 is inserted into the radio telephone device 101 which is identified as the host. The encrypted PIN number and/or the CIK split and/or biometric split jointly referred to as "access data" are transferred from the card 105 to the host 101. The access data is encrypted in a private key known only to the trusted third party as noted above. The host 101 decrypts the access data utilizing a public key (PK) that was previously loaded into the host 101. The user must enter his personal identification number (PIN). If the personal identification number is rejected, the security options are disabled. If the personal identification number (PIN) is accepted, the user must provide biometric information. At host 101, the access information is used to uncover the credentials and then the credentials are decrypted using a public universal key PK key. The decrypted credentials are utilized to configure an encryption engine at host 101 and a secure session utilizing the selected encryption engine may be initiated.

Turning now to FIG. 7, another embodiment is shown. Smart card 105 includes stored therein an access decryption algorithm which receives access data from host 101. After using the access data provided by host 101 and utilizing the access decryption algorithm stored on the smart card 105, the credentials are uncovered and transferred to the host 105. All other functions in this embodiment are the same as the embodiment described with reference to FIG. 6.

The invention has been described in conjunction with the illustrative embodiment of the invention. As will be apparent to those skilled in the art, various changes and modifications may be made to the above-described embodiment without departing from the spirit or scope of the invention. It is intended that the invention be limited not by the illustrative embodiment, but be limited only by the scope of the claims appended hereto.

What is claimed is:

1. A communication device comprising:
   a token receiving portion adapted to receive and read data stored in a token;
   encryption/decryption apparatus operable to provide for at least two levels of encrypted communications; and
   apparatus for obtaining data from said token and utilizing said data for enabling one of said at least two levels of encrypted communications;
   whereby said communications device may be used for secure communications in accordance with the enabled level of encrypted communications.

2. A communication device in accordance with claim 1, wherein said token is comprised entirely of software.

3. A communication device in accordance with claim 1, wherein said token is comprises a smart card.

4. A communication device in accordance with claim 3, wherein:
said smart card comprises a memory containing at least one portion of one encryption algorithm for one of said at least two levels of encrypted communications.

5. A communication device in accordance with claim 4, wherein said data comprises said at least one portion of said encryption algorithm.

6. A communications device in accordance with claim 1, wherein the encryption/decryption apparatus provides for a plurality of security levels.

7. A communications device in accordance with claim 6, wherein said plurality of security levels includes a level that provides general purpose privacy.

8. A smart card usable as a security token for enabling secure communications with a host communications device, said smart card comprising:
a memory portion containing a first portion of a first security algorithm and adapted to be received by said host communication device having a plurality of secure functions which are selectively operable according to a corresponding plurality of security algorithms including at least said first security algorithm; and
a processor for controlling transfer of said first portion of said first security algorithm to said host communication device;
wherein said host communication device contains a second portion of said first security algorithm and wherein said first portion and said second portion of said first security algorithm combine to form a key which enables access to said selectively operable secure functions that correspond to said first security algorithm.

9. A smart card in accordance with claim 8, wherein said memory portion further comprises:
a first portion of a second security algorithm;
wherein said processor controls the transfer of said first portion of said second security algorithm to said host communication device; and
wherein said host communication device contains a second portion of said second security algorithm and wherein said first portion and said second portion of said second security algorithm combine to form a key which enables access to said selectively operable secure functions that correspond to said second security algorithm.

10. A personal communication device for providing encrypted communications, said device comprising:
a token receiving portion adapted to receive a token;
encryption/decryption apparatus operable to provide communication at least one level of encryption;
apparatus for obtaining data stored in said token; and
a key generator for controlling access to secure functions of said personal communication device based on said data obtained from said token;
whereby said personal communication device may be used for secure functions in accordance with the enabled level of encrypted communications.

11. A personal communication device in accordance with claim 10, wherein said token is comprised entirely of software.

12. A personal communication device in accordance with claim 10, wherein said token is comprises a smart card.

13. A personal communication device in accordance with claim 12, wherein:
said smart card comprises a memory containing a first portion of one encryption algorithm for one level of encrypted communication; and
wherein said personal communication device comprises a memory containing a second portion of said one encryption algorithm for said one level of encrypted communication;
and wherein said key generator analyzes said first portion and said second portion to determine whether it is proper to enable access to secure functions associated with said one level of encrypted communication.

14. A personal communication device in accordance with claim 13, wherein:
said data comprises said at least one portion of said encryption algorithm.

15. A personal communication device in accordance with claim 10, wherein the encryption/decryption apparatus provides for a plurality of levels of encrypted communications.

16. A personal communication device in accordance with claim 15, wherein said plurality of levels of encrypted communications includes a level suitable for communication at a general purpose privacy level.

17. A method of providing secure communications with a communications device, comprising:
storing in said communications device first portions of a plurality of encryption algorithms each encryption algorithm corresponding to a predetermined level of secure communication;
storing in a token, a second portion of a selected one of said plurality of encryption algorithms;
utilizing said token to enable said selected one encryption algorithm, whereby communications are secured in accordance with said selected one encryption algorithm.

18. A method as claimed in claim 17 wherein the storing step includes the step of storing the second portion in a token comprised entirely of software.

19. A method as claimed in claim 17 wherein the storing step includes the step of storing the second portion in a token comprised of a smart card.

20. A method in accordance with claim 19, comprising:
reading said second portion from said smart card by said communications device; and
utilizing said first and second portions of said selected encryption algorithm to form a complete encryption algorithm; and
said communications device utilizing said complete encryption algorithm to secure communications.

* * * * *